(12) United States Patent
Li et al.

(10) Patent No.: US 12,503,515 B2
(45) Date of Patent: Dec. 23, 2025

(54) HUMANIZED 4-1BB MONOCLONAL ANTIBODY AND PHARMACEUTICAL COMPOSITION THEREOF

(71) Applicant: SOUND BIOPHARMACEUTICALS CO. LTD., Sichuan (CN)

(72) Inventors: Qing Li, Sichuan (CN); Fanxin Ma, Sichuan (CN); Zhong Wang, Sichuan (CN)

(73) Assignee: SOUND BIOPHARMACEUTICALS CO. LTD., Sichuan (CN)

( * ) Notice: Subject to any disclaimer, the term of this patent is extended or adjusted under 35 U.S.C. 154(b) by 877 days.

(21) Appl. No.: 17/777,914

(22) PCT Filed: Nov. 13, 2020

(86) PCT No.: PCT/CN2020/128615
§ 371 (c)(1),
(2) Date: May 18, 2022

(87) PCT Pub. No.: WO2021/098597
PCT Pub. Date: May 27, 2021

(65) Prior Publication Data
US 2022/0403039 A1    Dec. 22, 2022

(30) Foreign Application Priority Data

Nov. 19, 2019 (CN) .......................... 201911133718.7

(51) Int. Cl.
| | |
|---|---|
| *C07K 16/28* | (2006.01) |
| *A61K 31/675* | (2006.01) |
| *A61K 33/243* | (2019.01) |
| *A61K 38/19* | (2006.01) |
| *A61K 38/20* | (2006.01) |
| *A61K 39/00* | (2006.01) |
| *A61K 39/395* | (2006.01) |
| *A61K 40/10* | (2025.01) |
| *A61K 40/11* | (2025.01) |
| *A61K 40/42* | (2025.01) |
| *A61P 35/00* | (2006.01) |

(52) U.S. Cl.
CPC ........ *C07K 16/2878* (2013.01); *A61K 31/675* (2013.01); *A61K 33/243* (2019.01); *A61K 38/193* (2013.01); *A61K 38/2013* (2013.01); *A61K 39/3955* (2013.01); *A61K 40/10* (2025.01); *A61K 40/11* (2025.01); *A61K 40/42* (2025.01); *A61P 35/00* (2018.01); *A61K 2239/31* (2023.05); *A61K 2239/38* (2023.05); *C07K 2317/24* (2013.01); *C07K 2317/622* (2013.01)

(58) Field of Classification Search
None
See application file for complete search history.

(56) References Cited

U.S. PATENT DOCUMENTS

2019/0055314 A1   2/2019   Luo et al.

FOREIGN PATENT DOCUMENTS

| | | |
|---|---|---|
| CN | 109762066 | 5/2019 |
| CN | 110003332 | 7/2019 |
| EP | 3 744 734 | 12/2020 |
| WO | WO-00/29445 A1 | 5/2000 |
| WO | WO-2004010947 A2 * | 2/2004 ......... C07K 16/2878 |
| WO | WO-2012/032433 A1 | 3/2012 |
| WO | WO-2018/114754 A1 | 6/2018 |
| WO | WO-2019/072870 | 4/2019 |
| WO | WO-2019/141268 | 7/2019 |
| WO | WO-2020/231809 A1 | 11/2020 |

OTHER PUBLICATIONS

Chester et al., "Immunotherapy targeting 4-1BB: mechanistic rationale, clinical results, and future strategies," Blood, American Society of Hematology, 131(1):49-57 (Jan. 4, 2018).
Qi et al., "Optimization of 4-1BB antibody for cancer immunotherapy by balancing agonistic strength with FcyR affinity", Nature Communications, 10(1):2141, pp. 1-11 (May 20, 2019).
Son et al., "Humanization of agonistic anti-human 4-1BB monoclonal antibody using a phage-displayed combinatorial library," Journal of Immunological Methods, 286(1-2):187-201 (Mar. 1, 2004).
International Search Report and Written Opinion on PCT/CN2020/128615 dated Feb. 20, 2021 (10 pages).

* cited by examiner

*Primary Examiner* — Laura B Goddard
(74) *Attorney, Agent, or Firm* — Foley & Lardner LLP

(57) ABSTRACT

Disclosed is a humanized 4-1BB monoclonal antibody, an antigen-binding fragment thereof, a pharmaceutical composition and a medical use thereof. The monoclonal antibody comprises CDR1 with the amino acid sequence shown in SEQ ID NO: 1 or SEQ ID NO: 4, CDR2 with the amino acid sequence shown in SEQ ID NO: 2 or SEQ ID NO: 5, CDR3 with the amino acid sequence shown in SEQ ID NO: 3, CDR1' with the amino acid sequence shown in SEQ ID NO: 6, CDR2' with the amino acid sequence shown in SEQ ID NO: 7, CDR3' with the amino acid sequence shown in SEQ ID NO: 8. The monoclonal antibody binds to human 4-1BB with high affinity and specificity, leads to a significant increase in T cell proliferation and TNF-γ production, and enhances and stimulates human 4-1BB-mediated immune response.

10 Claims, 3 Drawing Sheets
Specification includes a Sequence Listing.

A

| Label | ka (1/Ms) | kd (1/s) | K_D (nM) |
|---|---|---|---|
| PP9146 | NA | NA | NA |
| PP9147 | 1.0E+05 | 3.50E-03 | 11.8 |
| PP9148 | NA | NA | NA |
| PP9149 | NA | NA | NA |
| PP9150 | 1.5E+05 | 5.5E-04 | 3.6 |
| PP9151 | NA | NA | NA |
| PP9152 | NA | NA | NA |
| PP9153 | 1.0E+05 | 5.6E-04 | 5.6 |
| PP9154 | NA | NA | NA |

HUMANIZED 4-1BB MONOCLONAL ANTIBODY AND PHARMACEUTICAL COMPOSITION THEREOF

CROSS-REFERENCE TO RELATED APPLICATIONS

This application is a U.S. National Phase Application under 35 U.S.C. § 371 of International Patent Application No. PCT/CN2020/128615, filed on Nov. 13, 2020, which claims priority to Chinese Application No. 201911133718.7, filed on Nov. 19, 2019, the content of each application is hereby incorporated by reference in its entirety.

TECHNICAL FIELD

The present disclosure relates to a humanized 4-1BB monoclonal antibody, an antigen-binding fragment thereof, a pharmaceutical composition and a medical use thereof.

BACKGROUND 4-1BB, also known as CD137 or TNFRSF9, belongs to the TNFR superfamily with a molecular weight of 50-55 kDa and is expressed on T cells, NK cells, NK T cells, dendritic cells (DCs), Tregs, and PDCA$^+$ B cells. 4-1BB binds to the ligand 4-1BBL expressed on APC cells with high affinity, thereby promoting T cell proliferation, enhancing cytokine production, and preventing activation-induced cell death (AICD).

Agonistic anti-4-1BB monoclonal antibodies (mAbs) have significant inhibitory effects on various autoimmune diseases and viral infections. A number of studies have shown that 4-1BB plays an important role in the pathogenesis of rheumatoid arthritis (RA). Soluble forms of 4-1BB and 4-1BB ligand (4-1BBL) are higher in RA patients than in healthy individuals, and their levels correlated with disease severity. In 4-1BB antibody treated arthritic mice, there was robust expansion of a novel CD8$^+$ T cells subset co-expressing the CD11c marker. These newly developed CD11c$^+$CD8$^+$ T cells are demonstrated to be responsible for the reduced arthritis symptoms. Further analysis revealed that the anti-4-1BB-induced CD11c$^+$CD8$^+$ T cells expressed high levels of IFN-γ. Experimental autoimmune uveoretinitis (EAU) is an inflammatory disease of the vascular layer of the eye that leads to visual impairment and can result in total blindness. Studies have shown that co-administration of 4-1BB antibody with an EAU-inducing agent (inter-photo receptor retinoid-binding protein, IRBP) results in significant expansion of CD11c$^+$CD8$^+$IFN-γ$^+$ T cells and IDO$^+$ DCs, and these cells in combination destroyed the pathogenic CD4$^+$ T cells. In addition, 4-1BB antibodies were also used to treat other autoimmune diseases, including multiple sclerosis (MS), type 1 diabetes (T1D), and lupus. Studies have also found that 4-1BB antibodies can interfere with certain viral infections, such as HSV-1, Japanese encephalitis virus (JEV), vaccinia virus, and lymphocytic choriomeningitis virus (LCMV).

The in vivo anti-tumor effect of 4-1BB antibodies were first discovered by Melero et al. in 1997. These authors observed that 4-1BB antibodies inhibited the growth of the poorly immunogenic sarcoma and highly immunogenic in mice. Subsequently, several investigators established that 4-1BB antibodies, either on their own or in combination with other anti-tumor agents, have powerful anti-cancer properties. When 4-1BB antibodies were injected into tumor-bearing SCID mice, tumor growth was significantly inhibited. Treatment of mice harboring sarcoma or glioma cells with 4-1BB antibodies prolonged the survival of the mice and led to tumor regression in a T cell-dependent manner. Furthermore, the 4-1BB antibodies have also shown therapeutic effects in endothelial tumors, renal cell tumors, and lung cancers. In addition, numerous studies have shown that 4-1BB antibodies are more effective when they are used in combination with other anti-cancer agents, for example, a combination of 4-1BB antibody and PD-1 antibody, a combination of 4-1BB antibody and CTLA-4 antibody, a combination of 4-1BB antibody and GM-CSF, a combination of 4-1BB antibody and CD40 antibody, a combination of cisplatin and 4-1BB antibody, a combination of cyclophosphamide and 4-1BB antibody, a combination of 4-1BB antibody and cytokine-induced killer cell, a combination of 4-1BB antibody and CD4$^+$ T cell depletion, a combination of IL-2 and 4-1BB antibody, and etc. When used in combination with other anti-cancer agents, the anti-tumor effect mediated by 4-1BB antibody is amplified, which provides new ideas for the treatment of cancer. Variants of the 4-1BB antibody, such as the ScFv of the 4-1BB antibody, also have significant anti-tumor effects. Intra-tumoral injection of anti-4-1BB ScFv inhibited the growth of Hepa 1-6 tumors, and this anti-tumor effect is dependent on increased IFN-γ and increased tumor infiltration by T cells.

However, no 4-1BB antibody has thus far been approved, and many clinical studies failed, of which unsatisfactory effect in vivo and serious side effects including hepatotoxicity, thrombocytopenia, leukopenia, etc., were the main reasons for their failure. Currently, only two 4-1BB mAbs are in clinical trials, fully humanized Urelumab from Bristol Myers Squibb and PF2566 from Pfizer. Therefore, there is a need to provide more 4-1BB antibodies to meet the market demand.

SUMMARY

The present disclosure provides a humanized 4-1BB monoclonal antibody or an antigen-binding fragment thereof, wherein the monoclonal antibody comprises (1) heavy chain complementarity determining regions CDR1, CDR2, CDR3, wherein the CDR1 comprises the amino acid sequence shown in SEQ ID NO: 1 or SEQ ID NO: 4, CDR2 comprises the amino acid sequence shown in SEQ ID NO: 2 or SEQ ID NO: 5, and the CDR3 comprises the amino acid sequence shown in SEQ ID NO: 3; and (2) light chain complementarity determining regions CDR1', CDR2', CDR3', wherein the CDR1' comprises the amino acid sequence shown in SEQ ID NO: 6, the CDR2' comprises the amino acid sequence shown in SEQ ID NO: 7, and the CDR3' comprises the amino acid sequence shown in SEQ ID NO: 8.

In another aspect, the present disclosure provides a humanized 4-1BB monoclonal antibody or an antigen-binding fragment thereof, wherein the monoclonal antibody comprises a heavy chain variable region (VH) and a light chain variable region (VL), wherein the heavy chain variable region comprises the amino acid sequence shown in SEQ ID NO: 9 or SEQ ID NO: 10, and the light chain variable region comprises the amino acid sequence shown in SEQ ID NO: 11.

In another aspect, the present disclosure provides a humanized 4-1BB monoclonal antibody or an antigen-binding fragment thereof, wherein monoclonal antibody comprises a heavy chain and a light chain, wherein the heavy chain comprises the amino acid sequence shown in SEQ ID NO: 12 or SEQ ID NO: 13, and the light chain comprises the amino acid sequence shown in SEQ ID NO: 14.

In another aspect, the present disclosure provides a pharmaceutical composition comprising the humanized monoclonal antibody or antigen-binding fragment thereof disclosed herein, and a pharmaceutically acceptable carrier.

In another aspect, the present disclosure provides a kit comprising an independent first formulation comprising the humanized monoclonal antibody or antigen-binding fragment thereof disclosed herein and an independent second formulation with anticancer activity. The second preparation is, for example, PD-1 antibody, CTLA-4 antibody, GM-CSF, CD40 antibody, cisplatin, cyclophosphamide, cytokine-induced killer cells, IL-2, etc.

In another aspect, the present disclosure provides uses of the humanized monoclonal antibody or antigen-binding fragment thereof that binds to human 4-1BB disclosed herein in the manufacture of a medicament for treating cancer, autoimmune diseases, inflammatory diseases or viral infections.

The humanized monoclonal antibodies or antigen-binding fragments thereof disclosed herein have broad medicinal uses, such as for the treatment of cancer, autoimmune diseases, inflammatory diseases or viral infections. In one aspect, the present disclosure provides a method of treating cancer in a subject, comprising administering a therapeutically effective amount of the humanized monoclonal antibody or antigen-binding fragment thereof disclosed herein that binds to human 4-1BB to the subject. In another aspect, the present disclosure provides a method of treating an autoimmune disease in a subject, comprising administering a therapeutically effective amount of the humanized monoclonal antibody or antigen-binding fragment thereof disclosed herein that binds to human 4-1BB to the subject. In another aspect, the present disclosure provides a method of treating an inflammatory disease in a subject, comprising administering a therapeutically effective amount of the humanized monoclonal antibody or antigen-binding fragment thereof disclosed herein that binds to human 4-1BB to the subject. In another aspect, the present disclosure provides a method of treating a viral infection in a subject, comprising administering a therapeutically effective amount of the humanized monoclonal antibody or antigen-binding fragment thereof disclosed herein that binds to human 4-1BB to the subject.

In addition, the present disclosure also provides cell lines producing the antibodies of or antigen-binding fragments thereof disclosed herein, recombinant expression vectors comprising the nucleotides disclosed herein, and methods producing antibodies by culturing the antibody-producing cell lines.

The humanized monoclonal antibody disclosed herein binds to human 4-1BB with high affinity and specificity, leads to a significant increase in T cell proliferation and TNF-γ production, and enhances and stimulates human 4-1BB-mediated immune response. The antibodies can be used as immunopotentiators for antitumor or antiviral immune responses, or as immunomodulators for T cell-mediated autoimmune diseases. The antibodies can also be used as diagnostic reagents to detect human 4-1BB in the blood or tissues of patients with cancer, autoimmune diseases or other diseases.

DETAILED DESCRIPTION OF THE EMBODIMENTS

Antibodies

Figure 1:
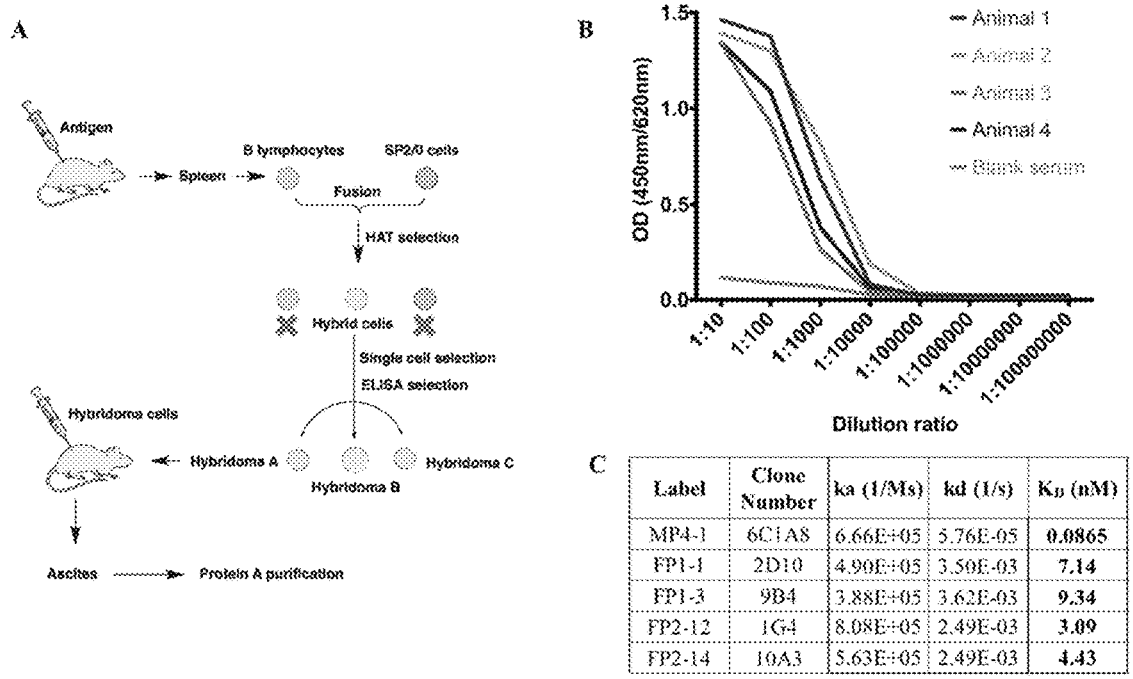
FIG. 1. Generation of mAbs against rh4-1BB. A. schematic illustration of hybridoma generation and screening. B. ELISA data of serum titration assay. The binding intensity ($OD_{450}$) was shown as the mean of triplicate wells. C. Binding affinity measurement results of mAbs to 4-1BB antigen.

As used herein, the term "antibody" as used herein refers to any form of antibody that exhibits the desired biological activity, for example, inhibiting the binding of a ligand to its receptor or inhibiting receptor signal transduction induced by the ligand. "Antibody fragment" and "antigen-binding fragment" refer to antigen-binding fragments of antibodies and antibody analogs, typically including at least a portion of the antigen-binding or variable regions (e.g., one or more CDRs) of the parent antibody. Antibody fragments retain at least some of the binding specificity of the parent antibody. Typically, antibody fragments retain at least 10% of the binding activity of the parent antibody when the activity is expressed on a molar basis. Preferably, antibody fragments retain at least 20%, 50%, 70%, 80%, 90%, 95% or 100% or more of the binding affinity of the parent antibody for the target. Examples of antibody fragments include, but are not limited to: Fab, Fab', F(ab')2, and Fv fragments; diabodies; linear antibodies; single-chain antibody molecules, such as sc-Fv; nanobodies; domain antibodies; and multi-specific antibodies formed from antibody fragments.

As used herein, the term "Fab fragment" consists of one light chain and the CH1 and variable regions of one heavy chain. The heavy chain of a Fab molecule cannot form a disulfide bond with another heavy chain. The "Fc" region contains two heavy chain fragments comprising the CH1 and CH2 domains of the antibody. The two heavy chain fragments are held together by two or more disulfide bonds and by hydrophobic interactions of the CH3 domains. A "Fab' fragment" contains a light chain and a portion of a heavy chain comprising the VH and CH1 domains and the region between the CH1 and CH2 domains, whereby an interchain disulfide bond can be formed between the two heavy chains of two Fab' fragments to form a F(ab')$_2$ molecule. A "F(ab')$_2$ fragment" contains two light chains and two heavy chains comprising portions of the constant region between the CH1 and CH2 domains, wherein an interchain disulfide bond is formed between the two heavy chains. Thus, an F(ab')$_2$ fragment consists of two Fab' fragments held together by disulfide bonds between the two heavy chains. A "Fv region" comprises variable regions from both heavy and light chains, but lacks constant regions.

As used herein, the term "single-chain Fv antibody" (or "scFv antibody") refers to an antibody fragment comprising the VH and VL domains of an antibody, wherein these domains are present in a single polypeptide chain. In general, Fv polypeptides contain an additional polypeptide linker between the VH and VL domains that enables the scFv to form the desired structure for antigen binding.

As used herein, the term "diabody" refers to small antibody fragment with two antigen-binding sites. The fragment comprises a heavy chain variable region (VH) linked to a light chain variable region (VL) in the same polypeptide chain, e.g., VH-VL or VL-VH. By using a linker that is short enough to pair two domains that are not on the same chain, the domains are forced to pair with the complementary domains of the other chain and form two antigen binding sites.

As used herein, the term "human antibody" refers to an antibody whose amino acid sequence corresponds to that of an antibody produced by a human, and/or an antibody that has been prepared using any of the techniques for preparing human antibodies shown herein. Humanized antibodies that contain non-human antigen-binding residues are specifically excluded from this definition.

Monoclonal Antibodies

As used herein, the term "monoclonal antibody" refers to an antibody obtained from a population of substantially homogeneous antibodies, i.e., the individual antibodies that make up the population are identical except for possible natural mutations that may be present in minor amounts. Monoclonal antibodies are highly specific and can be directed against a single antigenic site. Furthermore, in contrast to conventional (polyclonal) antibody preparations, which typically include multiple different antibodies directed against multiple different determinants (epitopes), each monoclonal antibody is directed against only a single determinant on an antigen. The modifier "monoclonal" refers to the properties of an antibody obtained from a substantially homogeneous population of antibodies and should not be construed as requiring any particular method to prepare said antibody. For example, the monoclonal antibodies disclosed herein may be prepared by hybridoma or recombinant DNA. Monoclonal antibodies may include "chimeric" antibodies.

In one aspect, the 4-1BB monoclonal antibody disclosed herein comprises (1) heavy chain complementarity determining regions CDR1, CDR2, CDR3, wherein the CDR1 comprises the amino acid sequence shown in SEQ ID NO: 1 or SEQ ID NO: 4, the CDR2 comprises the amino acid sequence shown in SEQ ID NO: 2 or SEQ ID NO: 5, and the CDR3 comprises the amino acid sequence shown in SEQ ID NO: 3; and (2) light chain complementarity determining regions CDR1', CDR2', CDR3', wherein the CDR1' comprises the amino acid sequence shown in SEQ ID NO: 6, the CDR2' comprises the amino acid sequence shown in SEQ ID NO: 7, and the CDR3' comprises the amino acid sequence shown in SEQ ID NO: 8.

In some embodiments, the complementarity determining regions of the 4-1BB monoclonal antibody comprise (a) CDR1 comprises the amino acid sequence shown in SEQ ID NO: 1, CDR2 comprises the amino acid sequence shown in SEQ ID NO: 2, CDR3 comprises the amino acid sequence shown in SEQ ID NO: 3, CDR1' comprises the amino acid sequence shown in SEQ ID NO: 6, CDR2' comprises the amino acid sequence shown in SEQ ID NO: 7, and CDR3' comprises the amino acid sequence shown in SEQ ID NO: 8; or (b) CDR1 comprises the amino acid sequence shown in SEQ ID NO: 4, CDR2 comprises the amino acid sequence shown in SEQ ID NO: 5, CDR3 comprises the amino acid sequence shown in SEQ ID NO: 3, CDR1' comprises the amino acid sequence shown in SEQ ID NO: 6, CDR2' comprises the amino acid sequence shown in SEQ ID NO: 7, and CDR3' comprises the amino acid sequence shown in SEQ ID NO: 8.

In another aspect, the 4-1BB monoclonal antibody disclosed herein comprises (1) a heavy chain variable region comprising the amino acid sequence shown in SEQ ID NO: 9 or SEQ ID NO: 10; and (2) a light chain variable region comprising the amino acid sequence shown in SEQ ID NO: 11.

In another aspect, the 4-1BB monoclonal antibody disclosed herein comprises (1) a heavy chain comprising the amino acid sequence shown in SEQ ID NO: 12 or SEQ ID NO: 13; and (2) a light chain comprising the amino acid sequence shown in SEQ ID NO: 14.

It is expected that the binding domain of the monoclonal antibody disclosed herein may carry a signal peptide, which is usually located at the N-terminus of the secreted protein and generally consists of 15-30 amino acids. When the signal peptide sequence is synthesized, it is recognized by the signal recognition granule (SRP), protein synthesis is suspended or slowed down, the signal recognition granule carries the ribosome to the endoplasmic reticulum, and the protein synthesis restarts. Under the guidance of the signal peptide, the newly synthesized protein enters the endoplasmic reticulum cavity, and the signal peptide sequence is cleaved under the action of the signal peptidase. If the termination transit sequence exists at the C-terminus of the nascent peptide chain, it may not be cleaved by the signal peptidase, for example, ovalbumin contains an internal signal peptide, and neither its precursor nor the mature form is cleaved by signal peptidase. An exemplary signal peptide sequence is MDPKGSLSWRILLFLSLAFELSYG. Another exemplary signal peptide sequence is METDTLLLWVLLL-WVPGSTG.

As used herein, the term "specifically binds" means that the monoclonal antibodies disclosed herein are capable of specifically interacting with at least two, three, four, five, six, seven, eight or more amino acids of each human target molecule. The "specific binding" of an antibody is mainly characterized by two parameters: a qualitative parameter (binding epitope or antibody binding site) and a quantitative parameter (binding affinity or binding strength). Antibody binding epitopes may be determined by FACS, peptide dot epitope mapping, mass spectrometry, or peptide ELISA. The Biacore and/or ELISA may measure the binding strength of an antibody to a specific epitope. Signal-to-noise ratios are often calculated as a representative measure of binding specificity. In such a signal-to-noise ratio, the signal represents the strength of antibody binding to the target epitope, and the noise represents the strength of antibody binding to other non-target epitopes. Preferably, when the signal-to-noise ratio for a target epitope is about 50, the evaluated antibody may be considered to bind to the target epitope in a specific manner, i.e., "specifically binds".

Variants

As used herein, a "variant" sequence refers to a sequence that differs from the sequence shown at one or more amino acid residues but retains the biological activity of the resulting molecule.

As used herein, the terms "conservatively modified variants" or "conservative amino acid substitutions" refer to amino acid substitutions known to a skill person in the art that generally do not alter the biological activity of the resulting molecule. In general, it is recognized by a skilled person in the art that single amino acid substitutions in non-essential regions of a polypeptide do not substantially alter biological activity.

As used herein, "% identity" between two sequences refers to a function of the number of identical positions shared by the sequences, i.e., % identity=number of equivalent positions/total number of positions×100, wherein the number of gaps and the length of each gap will be considered, and the gaps need to be introduced when performing an optimal alignment of the two sequences. Sequences alignment and determination of % identity between two sequences may be accomplished using mathematical algorithms. For example, the % identity between two amino acid sequences may be determined using the algorithm of E. Meyers and W. Miller (Comput.Appl.Biosci., 4: 11-17 (1988)). This algorithm has been introduced into the ALIGN program (version 2.0), which uses the PAM120 weight residue table with a gap length penalty of 12 and a gap penalty of 4. Additionally, the % identity between two amino acid sequences may be determined using the algorithm of Needleman and Wunsch (J. MoI. Biol. 48:444-453 (1970)). This algorithm has been introduced into the GAP program of the GCG package (available at www.gcg.com), which uses a Blossum 62 matrix or a PAM250 matrix with gap weights of 16, 14, 12, 10, 8, 6 or 4 and length weights of 1, 2, 3, 4, 5, or 6.

When referring to a ligand/receptor, antibody/antigen, or other binding pair, "specific" binding refers to a binding reaction that determines the presence or absence of a protein in a heterogeneous population of the protein and/or other biological agent. Thus, under the specified conditions, a specific ligand/antigen binds to a specific receptor/antibody, and does not bind to other proteins present in the sample in significant amounts.

Humanized Antibodies

Humanized antibodies have one or more amino acid residues from a non-human source. Humanization is generally carried out by substituting rodent CDRs or CDR sequences for the corresponding sequences of the human antibody. Thus, the "humanized" antibodies are chimeric antibodies in which a very small portion of the fully human variable domains have been replaced with corresponding sequences from non-human species. In practice, humanized antibodies are generally human antibodies in which certain CDR residues and possibly certain FR residues are replaced by residues from analogous sites in non-human (e.g., rodent) antibodies.

The selection of human variable domains (both light and heavy chains) used to prepare humanized antibodies is extremely important to reduce antigenicity. According to the so-called "best fit" method, the variable domain sequences of rodent antibodies are screened against the complete library of known human variable domain sequences. The human sequence closest to the rodent sequence was then used as the human framework (FR) for the humanized antibody. Another approach uses a specific framework derived from sequences common to all human antibodies of a specific subgroup of light or heavy chains. The same framework may be used for several different humanized antibodies.

More importantly, the antibody is humanized so that it retains high affinity for the antigen and other favorable biological properties. To this end, according to a preferred method, humanized antibodies are prepared by a method of analyzing the parental sequences and various conceptually humanized products using three-dimensional models of the parental and humanized sequences. Three-dimensional immunoglobulin models are generally available and familiar to a skilled person in the art. Computer programs are available that elucidate and display probable three-dimensional conformational structures of selected candidate immunoglobulin sequences. Examination of these revealed structures allows analysis of the possible role the residues play in the function of the candidate immunoglobulin sequence, i.e., the analysis of residues that affect the ability of the candidate immunoglobulin to bind to its antigen. In this way, FR residues can be selected and combined from the acceptor and import sequences so as to obtain desired antibody properties, such as increased affinity for one or more target antigens. In general, CDR residues are directly and most fully involved in influencing antigen binding.

Humanization of antibodies is simple protein engineering. Almost all murine antibodies can be humanized by CDR grafting, thereby maintaining antigen binding. Alternatively, it is now possible to generate transgenic animals (e.g., mice) capable of producing a complete repertoire of human antibodies after immunization without the production of endogenous immunoglobulins. For example, it has also been demonstrated that homozygous deletion of joining region (JH) gene of the heavy chain of the antibody in chimeric and germline mutant mice completely inhibits production of endogenous antibody.

Antibody Purification

When using recombinant techniques, antibodies may be produced intracellularly, in the periplasmic space, or secreted directly into the medium. If the antibody is produced intracellularly, particulate debris (host cells or lysed fragments) is removed as a first step, e.g., by centrifugation or ultrafiltration. When the antibody is secreted into the medium, the supernatant from the expression system is typically first concentrated using a commercially available protein concentration filter, e.g., Amicon or Millipore Pellicon ultrafiltration units. Protease inhibitors (e.g., PMSF) may be used in any of the preceding steps to inhibit proteolysis and antibiotics may be used to prevent the growth of foreign contaminants.

Depending on the antibody to be recovered, other protein purification techniques may also be used, for example, fractionation on ion exchange column, ethanol precipitation, reverse phase HPLC, silica gel chromatography, anion or cation exchange resin (e.g., polyaspartic acid column) chromatography, chromatographic focusing, SDS-PAGE and ammonium sulfate precipitation. In one embodiment, glycoproteins can be purified by a method comprising: adsorbing the glycoprotein to a lectin substrate (e.g., lectin affinity column) to remove the fucose-containing glycoprotein from the preparation and thereby enrich the fucose-free glycoprotein.

Pharmaceutical Compositions and Kits

"Pharmaceutical composition" refers to a pharmaceutical formulation for use in humans. The pharmaceutical composition comprises humanized monoclonal antibodies or antigen-binding fragments thereof disclosed herein and suitable formulations of carriers, stabilizers and/or excipients. The present disclosure provides pharmaceutical formulations comprising the monoclonal antibodies or antigen-binding fragments thereof disclosed herein. To prepare a pharmaceutical composition or a sterile composition, the antibody or antigen-binding fragment thereof is mixed with a pharmaceutically acceptable carrier or excipient. The therapeutic and diagnostic preparation of drugs can be prepared in the form of, for example, lyophilized powder, slurry, aqueous solution or suspension by mixing with physiologically acceptable carriers, excipients or stabilizers.

The toxicity and therapeutic efficacy of antibody compositions administered alone or in combination with immunosuppressive agents can be measured in cell cultures or experimental animals by standard pharmaceutical methods, such as methods for determining $LD_{50}$ (dose causing 50% of the population lethal) or $ED_{50}$ (dose effective to treat 50% of the population). The dose ratio between toxic and therapeutic effects is the therapeutic index, which can be expressed as the ratio of $LD_{50}$ to $ED_{50}$. The data obtained from these cell culture assays and animal studies can be used to formulate a range of dosages for use in humans. The dosage of the antibody is preferably within a range of circulating concentrations that include the $ED_{50}$ with little or no toxicity. The dosage can be varied within this range according to the dosage form used and the route of administration used.

Suitable routes of administration include parenteral administration (for example, intramuscular, intravenous or subcutaneous administration) and oral administration. The antibody used in the pharmaceutical composition or for practicing the method of the present invention can be administered in a variety of conventional ways, such as oral ingestion, inhalation, topical application or transdermal, subcutaneous, intraperitoneal, parenteral, intraarterial or intravenous injection. In one embodiment, the antibody of the invention is administered intravenously. In another embodiment, the antibody of the invention is administered subcutaneously. Alternatively, one can administer the antibody in a local rather than systemic manner (usually a long-acting or sustained-release formulation), for example via injection of the antibody directly to the site of action. In addition, one can administer the antibody in a targeted drug delivery system.

The appropriate dose is determined by the clinician, for example, using parameters or factors known or suspected to affect the treatment or expected to affect the treatment in the art. Generally, the starting dose is slightly lower than the optimal dose, and thereafter a small increase until the desired or optimal effect relative to any adverse side effects is achieved. Important diagnostic measures include measuring, for example, inflammatory symptoms or the level of inflammatory cytokines produced.

The antibodies, antibody fragments and cytokines can be administered by continuous infusion or by dosing at regular intervals, for example, one day, one week, or 1-7 times a week. The dose can be provided intravenously, subcutaneously, intraperitoneally, transdermally, topically, orally, nasally, transrectally, intramuscularly, intracerebrally, intraspinally, or by inhalation. A preferred dosage regimen is a regimen that includes the maximum dosage or dosing frequency that avoids significant undesirable side effects. The total weekly dose is usually at least 0.05 µg/kg body weight, more usually at least 0.2 µg/kg, most usually at least 0.5 µg/kg, typically at least 1 µg/kg, more typically at least 10 µg/kg, most typically at least 100 µg/kg, preferably at least 0.2 mg/kg, more preferably at least 1.0 mg/kg, most preferably at least 2.0 mg/kg, ideally at least 10 mg/kg, more ideally at least 25 mg/kg, and most ideally at least 50 mg/kg. Based on mol/kg calculation, the required dose of small molecule therapeutics such as peptide mimetics, natural products or organic chemical agents is approximately the same as the dose of antibodies or polypeptides.

The pharmaceutical composition disclosed herein may also contain other agents, including but not limited to cytotoxic agents, cell growth inhibitors, anti-angiogenic drugs or antimetabolites, targeted tumor drugs, immunostimulants or immunomodulators, or antibodies conjugated to cytotoxic agents, cell growth inhibitors or other toxic drugs. The pharmaceutical composition can also be administered with other treatment modalities such as surgery, chemotherapy, and radiation. Typical veterinarians, experiments or research subjects include monkeys, dogs, cats, rats, mice, rabbits, guinea pigs, horses, and humans.

The humanized monoclonal antibody or antigen-binding fragment thereof disclosed herein can be used alone or in combination with the following substances: anti-tumor drugs or immunogenic agents, such as attenuated cancer cells; tumor antigens including recombinant proteins, peptides and carbohydrate molecules; antigen-presenting cells, such as tumor-derived dendritic cells stimulated by the antigen or nucleic acid, immunostimulatory cytokines (such as IL-2, $IFN_{a2}$, GM-CSF) and cells transfected with genes encoding immunostimulatory cytokines (such as but not limited to GM-CSF); standard cancer treatment (such as chemotherapy, radiotherapy or surgery); or other antibodies, including but not limited to antibodies against the following antigens: VEGF, EGFR, VEGF receptors, other growth factor receptors, CD20, CD40, CTLA-4, OX-40, 4-IBB and ICOS.

Accordingly, the present disclosure provides a kit for carrying out the above-mentioned combination therapy, which comprises an independent first formulation comprising the humanized monoclonal antibody or antigen-binding fragment thereof disclosed herein and an independent second formulation with anticancer activity. In some embodiments, the subject is sometimes administered the second formulation concurrently with the humanized monoclonal antibody or antigen-binding fragment thereof disclosed herein. In some embodiments, the second formulation and the humanized monoclonal antibody or antigen-binding fragment thereof disclosed herein are administered separately. In some embodiments, the second formulation or other agent typically administered to cancer patients and the humanized monoclonal antibody or antigen-binding fragment thereof disclosed herein may be administered in combination as a pharmaceutical composition.

As used herein, the term "second formulation" or "second anti-cancer agent" refers to any anti-tumor drug, including but not limited to: PD-1 antibody, CTLA-4 antibody, GM-CSF, CD40 antibody, cisplatin, cyclophosphamide, cytokine-induced killer cells, IL-2, etc.

In one aspect, the present disclosure provides a method of treating a tumor comprising administering a therapeutically effective amount of a humanized monoclonal antibody or antigen-binding fragment thereof disclosed herein to a subject suffering from a tumor. In some embodiments, the humanized monoclonal antibody comprises (1) heavy chain complementarity determining regions CDR1, CDR2, CDR3, wherein the CDR1 comprises the amino acid sequence shown in SEQ ID NO: 1 or SEQ ID NO: 4, the CDR2 comprises the amino acid sequence shown in SEQ ID NO: 2 or SEQ ID NO: 5, and the CDR3 comprises the amino acid sequence shown in SEQ ID NO: 3; and (2) light chain complementarity determining regions CDR1', CDR2', CDR3', wherein the CDR1' comprises the amino acid sequence shown in SEQ ID NO: 6, the CDR2' comprises the amino acid sequence shown in SEQ ID NO: 7, and the CDR3' comprises the amino acid sequence shown in SEQ ID NO: 8. In some embodiments, the humanized monoclonal antibody comprises (1) a heavy chain variable region VH comprising the amino acid sequence shown in SEQ ID NO: 9 or SEQ ID NO: 10; and (2) a light chain variable region VL comprising the amino acid sequence shown in SEQ ID NO: 11. In some embodiments, the humanized monoclonal antibody comprises (1) a heavy chain H comprising the amino acid sequence shown in SEQ ID NO: 12 or SEQ ID NO: 13; and (2) a light chain L comprising the amino acid sequence shown in SEQ ID NO: 14. In some embodiments, the subject is a mammal, preferably a human.

In another aspect, the present disclosure provides a method of treating a tumor comprising administering a therapeutically effective amount of a pharmaceutical composition disclosed herein to a subject suffering from a tumor. In some embodiments, the pharmaceutical composition comprises a humanized monoclonal antibody or antigen-binding fragment thereof disclosed herein and a pharmaceutically acceptable carrier. In some embodiments, the pharmaceutical composition comprises the humanized monoclonal antibody or antigen-binding fragment thereof disclosed herein and a second anti-cancer agent. In some embodiments, the subject is a mammal, preferably a human.

Treatment

When "administering" and "treating" refer to an animal, human, subject, cell, tissue, organ or biological fluid, it refers to contacting the animal, human, subject, cell, tissue, organ or biological fluid with an exogenous drug, therapeutic agent, diagnostic agent or composition. "Administration" and "treatment" may refer to, for example, therapeutic methods, pharmacokinetic methods, diagnostic methods, research methods, and experimental methods. Treatment of the cells includes contacting the agent with the cells and contacting the agent with a fluid, wherein the fluid is in contact with the cells. "Administration" and "treatment" also mean in vitro and ex vivo treatment of cells, e.g., by agents, diagnostic agents, binding compositions, or by other cells.

As used herein, "inhibition" or "treatment" includes delaying the development of symptoms associated with a disease and/or reducing the severity of these symptoms that the disease will or expected to develop. The term also includes alleviating existing symptoms, preventing additional symptoms, and alleviating or preventing the underlying causes of these symptoms. Therefore, the term means that a beneficial result has been conferred on a vertebrate subject suffering from a disease.

Therapeutically Effective Amount

As used herein, the term "therapeutically effective amount" or "effective amount" refers to when humanized monoclonal antibody or antigen-binding fragment thereof disclosed herein is administered alone or in combination with another therapeutic agent to a cell, tissue or subject, it effectively prevents or slows the amount of the disease or condition to be treated. A therapeutically effective dose further refers to the amount of the antibody sufficient to cause alleviation of symptoms, such as treating, curing, preventing or alleviating related medical conditions, or improving the treatment rate, cure rate, prevention rate, or alleviation rate of the symptoms. When administered to an individual alone, the therapeutically effective amount refers to the mount of the alone ingredient. When a combination is administered, the therapeutically effective amount refers to the combined amount of active ingredients that produce a therapeutic effect, regardless of whether it is administered in combination, sequentially or simultaneously. A therapeutically effective amount will reduce symptoms usually by at least 10%; usually at least 20%; preferably at least about 30%; more preferably at least 40% and most preferably at least 50%.

In the present disclosure, "about" means that the value is within an acceptable error range of the particular value determined by one of ordinary skill in the art, wherein the value depends in part on how it is measured or determined (i.e., the limits of the measurement system). For example, "about" can mean within 1 or more than 1 standard deviation in the art. Alternatively, "about" or "substantially comprising" may mean a range of up to 20%. Furthermore, particularly with respect to biological systems or processes, the term may mean at most one order of magnitude or at most five times the value. Unless otherwise indicated, when a specific value appears in the application and in the claims, the meaning of "about" or "substantially comprising" should be assumed to be within an acceptable error range for the specific value.

Cancer

The humanized monoclonal antibody or antigen-binding fragment thereof disclosed herein can be used to treat cancers, i.e., inhibit the growth or survival of tumor cells. Preferred cancers whose growth can be inhibited by the antibody disclosed herein include cancers that generally respond to immunotherapy. Non-limiting examples of preferred cancers for treatment include, but are not limited to, esophageal cancer, stomach cancer, colon cancer, rectal cancer, pancreatic cancer, lung cancer, breast cancer, cervical cancer, corpus carcinoma, ovarian cancer, bladder cancer, head and neck cancer, endometrial cancer, osteosarcoma, prostate cancer, and neuroblastoma.

Autoimmune Disease

As used herein, the term "autoimmune disease" refers to a class of diseases induced by damage caused by attacking its own organs, tissues or cells due to the breakdown of immune tolerance of the immune system of body to its own components. This can be limited to certain organs or involve specific tissues in different locations. Treatment of autoimmune diseases is usually with immunosuppression, such as drugs that reduce the immune response.

In the present disclosure, the humanized monoclonal antibody or antigen-binding fragment thereof disclosed herein can be used to treat autoimmune diseases. Autoimmune diseases that can be treated with the antibodies or antigen-binding fragments thereof disclosed herein include, but are not limited to, Graves' disease, multiple sclerosis, autoimmune liver disease, primary adrenal atrophy, chronic thyroiditis, type 1 diabetes, systemic lupus erythematosus, psoriasis, Crohn's disease, atopic dermatitis, autoimmune hemolytic anemia, myasthenia gravis, demyelinating disease, eczema, graft-versus-host disease, rheumatoid arthritis, scleroderma, sjogren syndrome, chronic nephritis, ankylosing spondylitis, chronic active hepatitis, atrophic gastritis, autoimmune glomerulonephritis, pulmonary and renal hemorrhagic syndrome, idiopathic thrombocytopenic purpura, idiopathic leukopenia, chronic thyroiditis, pernicious anemia, chronic ulcerative colitis.

Inflammatory Disease

As used herein, the term "inflammatory disease" refers to a disease caused by, produced by, or resulting in inflammation. The term "inflammatory disease" can also refer to a dysregulated inflammatory response that results in an overreaction of macrophages, granulocytes, and/or T lymphocytes, resulting in abnormal tissue damage and/or cell death. Inflammatory diseases can be acute or chronic inflammatory conditions and can be caused by infectious or non-infectious causes.

In the present disclosure, the humanized monoclonal antibody or antigen-binding fragment thereof disclosed herein can be used to treat inflammatory diseases. Inflammatory diseases that can be treated with the antibodies or antigen-binding fragments thereof disclosed herein include, but are not limited to, arthritis, tendinitis, arteriosclerosis, polymyalgia rheumatica, bursitis, cystic fibrosis, arthrosteitis, giant cell arteritis, polymyositis, dermatomyositis, pemphigus, pemphigoid, mixed connective tissue disease, sclerosing cholangitis, inflammatory bowel disease, ulcerative colitis, inflammatory skin diseases, asbestosis, silicosis, pneumoconiosis, sarcoidosis, extrinsic allergic alveolitis, hepatitis, delayed type hypersensitivity, pneumonia, respiratory tract inflammation, adult respiratory distress syndrome (ARDS), encephalitis, immediate hypersensitivity, asthma, hay fever, allergies, acute anaphylaxis, rheumatic fever, cystitis, chronic cholecystitis, allograft rejection, host-versus-graft rejection, appendicitis, arteritis, bronchiolitis, bronchitis, cervicitis, cholangitis, chorioamnionitis, conjunctivitis, dacryoadenitis, dermatomyositis, endocarditis, endometritis, enteritis, epicondylitis, epididymitis, fasciitis, fibrositis, gastritis, gastroenteritis, gingivitis, iritis, laryngitis, myelitis, myocarditis, nephritis, omphalitis, oophoritis, orchitis, osteitis, otitis, pancreatitis, mumps, pericarditis, pharyngitis, pleurisy, phlebitis, prostatitis, rhinitis, salpingitis, sinusitis, stomatitis, synovitis, orchitis, tonsillitis, urethritis, uveitis, vaginitis, vulvitis, vasculitis, osteomyelitis, optic neuritis, temporal arteritis, transverse myelitis, necrotizing fasciitis, and cardiovascular inflammation.

Viral Infection

As used herein, the term "infection" refers to the invasion of organisms by pathogens, their proliferation, and the response of host tissues to these organisms and the toxins they produce. Infections can be caused by infectious agents such as viruses, viroids, prions, bacteria, nematodes (such as parasitic roundworms and pinworms), arthropods (such as ticks, mites, fleas and lice), fungi (such as ringworm), and other giant parasites such as tapeworms and other worms. In the present disclosure, the infectious agent is a virus.

"Viral infection" refers to the process by which a virus invades the body through various pathways and proliferates in susceptible host cells. In the present disclosure, the humanized monoclonal antibody or antigen-binding fragment thereof disclosed herein can be used to treat viral infections. Viruses causing the viral infection include, but are not limited to, cytomegalovirus (CMV), Epstein-Barr virus (EBV), human immunodeficiency virus type 1 (HIV-1), human immunodeficiency virus type 2 (HIV-2), metapneumovirus, parainfluenza virus, influenza virus, respiratory syncytial virus (RSV), adenovirus, rhinovirus, coronavirus, enterovirus, coxsackievirus, dengue virus, Japanese encephalitis virus (JEV), hepatitis A virus, hepatitis B virus, hepatitis C virus, herpes simplex virus type 1, herpes simplex virus type 2, human herpes virus type 8, measles virus, mumps virus, human papilloma virus, polio virus, rabies virus, rubella virus and varicella-zoster virus.

Diseases or conditions associated with the viral infection include, but are not limited to: retinitis, enteritis, infectious mononucleosis, Hodgkin's lymphoma, Burkitt's lymphoma, nasopharyngeal carcinoma, Acquired Immune Deficiency Syndrome (AIDS), Upper Respiratory Tract Infection (URI), Lower Respiratory Tract Infection (LRI), myocarditis, encephalitis, Dengue Haemorrhagic Fever/Dengue Shock Syndrome (DHF/DSS), hepatitis A, hepatitis B, hepatitis C, gingivostomatitis, keratoconjunctivitis, skin papules, mumps, polio, rabies, rubella and chickenpox.

Immune Adjuvants

The humanized monoclonal antibodies or antigen-binding fragments thereof of the disclosure can be used in combination with other recombinant proteins and/or peptides (e.g., tumor antigens or cancer cells) to increase the immune response to these proteins (i.e., in a vaccination regimen). For example, a humanized monoclonal antibody or antigen-binding fragment thereof can be used to stimulate an antigen-specific immune response by co-administering the humanized monoclonal antibody or antigen-binding fragment thereof and an antigen of interest, e.g., a vaccine. Accordingly, in another aspect, the present disclosure provides a method of enhancing the immune response of a subject to an antigen, comprising administering (i) the antigen; and (ii) the humanized monoclonal antibody or antigen-binding fragment portion thereof disclosed herein to the subject to increase the immune response to the antigen. For example, the antigen can be a tumor antigen, a viral antigen, a bacterial antigen, or an antigen from a pathogen. Non-limiting examples of such antigens include, but are not limited to, tumor antigens or antigens from viruses, bacteria, or other pathogens.

Combinational Therapy

As described above, the monoclonal antibody or antigen-binding fragment portion thereof disclosed herein can be co-administered with one or more other therapeutic agents, such as cytotoxic agents, radiotoxic agents or immunosuppressive agents. The antibody can be conjugated to the agent as an immune complex, or can be administered separately from the therapeutic agent. In the latter case (separate administration), the antibody can be administered before, after or concurrently with the therapeutic agent, or it can be co-administered with other known therapies.

The antibodies can also be used in in vivo diagnostic assays. The antibody is usually labeled with a radionuclide, such as $^{111}$In, $^{99}$Tc, $^{4}$C, $^{31}$I $^{125}$I $^{3}$H, $^{32}$P, $^{35}$S, or $^{18}$F, so that immunoimaging or positron imaging can be used to locate the antigen or antigen-expressing cells.

The present disclosure will be more fully understood by referring to the following examples. However, these examples should not be construed as limiting the scope of the present disclosure. All documents and patent citations mentioned herein are expressly incorporated herein by reference.

EXAMPLES

Example 1. Generation of mAbs Against Rh4-1BB

Animals

All animal experiments were carried out under the authority of the Animal Experiment Facility of Sun Yat-sen University. Balb/c mice were purchased from the Animal Experiment Facility of Sun Yat-sen University. Non-obese diabetic-severe combined immunodeficiency (NOD/SCID) mice were purchased from Charles River Laboratories. Animals were housed in barrier rooms with pathogen-free conditions for those experiments involving immune-compromised mice.

Production of Monoclonal Antibody

To generate mAbs against rh4-1BB, four weeks old female Balb/c mice immunized subcutaneously (S.C) with human 4-1BB extracellular domain protein (Acro Biosystems) at 3 times with two weeks' intervals. All mice were bled one week after the third time's injection, sera were collected for screening via indirect ELISA to determine immune response. The splenocytes from immunized mice were separated and fused with SP2/0 mouse myeloma cells (purchased from the Shanghai Cell Bank) following standard procedure. Cells were seeded into 96-well plates and maintained in culture in hybridoma growth medium: RPMI-1640 (Gibco by life technology) containing 20% FBS, 1x HAT media supplement (Sigma). Hybridoma supernatants were screened by indirect ELISA and positive wells were selected for cloning (by limiting dilution process). Stable monoclones were selected for expansion and characterization of antibodies.

Result: In our earlier attempt to produce anti-4-1BB antibody, we used a higher dosage (50 ug per mouse) when do primary immunization, but all mice died within 10 days. As human 4-1BB showed 60% identity of amino acid sequence to mouse 4-1BB [2], probably the rh4-1BB served as a stimulated molecule and induce strong immune response that cause mice death. Then we decreased the dosage to 30 ug per mouse followed with two time's boosting immunization. To test the immunization efficacy, serum collected from mice before immunization and after the third injection were tested via indirect ELISA. The serum of the immune mice showed positive absorbance (OD>0.2) at 1/8000 dilution (FIG. 1B). Hybridoma clones were then generated and screened by ELISA using 4-1BB protein. 5 different hybridoma clones with strong binding were obtained and chose for further analysis.

Example 2. 4-1BB Binding Affinity of mAbs

Affinity Determination by Biolayer Interferometry (BLI)

Antibody affinity for 4-1BB extracellular domain was measured using an Octet RED96 instrument (ForteBio, Pall Life Sciences). All assays were performed with agitation set to 1000 rpm in assay buffer (PBS, PH7.4, 0.02% (v/v) Tween 20). Assays were performed in solid black 96-well plates (Greiner Bio-one, 655209) at 30° C. Purified 4-1BB antibodies in PBST were loaded onto the surface of anti-mouse IgG Fv Capture Biosensors (AMQ). Then a biosensor baseline step was used before the analysis of association of the antibody on the biosensor to the testing antigen for 300 s. Testing antigen was developed into a twofold concentration gradient in a titration series of seven. Following is a dissociation interaction recorded in wells containing assay buffer. Baseline drift was corrected by subtracting the shift recorded for a sensor loaded with antibody by not incubated with antigen. Octet data were evaluated using data analysis software version 9.0 (PALL/ForteBio) and a global fit 1:1 modal was used to determine the $K_D$ value.

Flow Cytometry Analysis of Antibodies Binding to Cell Surface 4-1BB 0.5 ug/ml OKT3 pre-coated in flat bottom 6-well plates and 0.5 ug/ml soluble PFC-1 (IL-15 fusion protein) were used to stimulate purified T cells at 37° C. in a 5% $CO_2$ humidified incubator. After 7 days' stimulation, activated T cells were harvested. 4-1BB antibodies were incubated with activated T cells or Jurkat cells (purchased from the Shanghai Cell Bank). Then cells were washed, and cell-bound antibody was detected with Alexa Fluor 488-labeled goat anti-human or mouse IgG (H+L) specific antibody and analyzed on a FC500 flow cytometer (BECKMAN COULTER).

Figure 2:
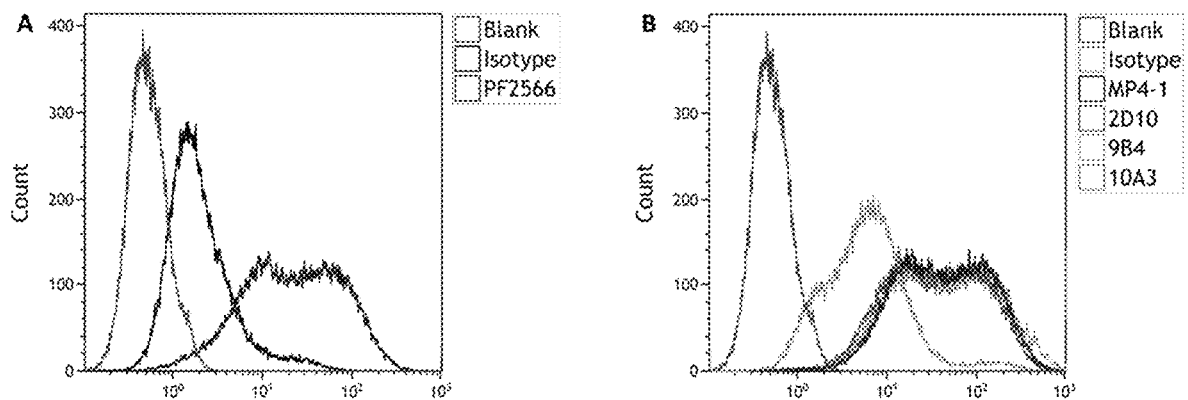
FIG. 2. 4-1BB antibodies can bind cell membrane bound 4-1BB. Flow cytometry analysis of 4-1BB mAbs on activated T cells.

Result: To evaluate the binding of mAbs to 4-1BB, the affinity of different antibodies to antigen was measured. MP4-1 showed superior binding to recombinant human 4-1BB by BLI analysis. The observed equilibrium dissociation constant ($K_D$) for 4-1BB ECD was 0.0865 nM, which is more than 35-fold higher than the other mAb-candidates (FIG. 1C). Binding of mAbs to cell membrane bound 4-1BB was measured using flow cytometry (FACS) with stimulated primary human T cells described above. Same as the positive control PF2566, each of our 4-1BB antibodies showed binding with activated T cells (FIG. 2).

Example 3. Antibody 4-1BB Ligand Competition Activity

Antibody 4-1BB Ligand Competition Assay

To determine if 4-1BB antibodies can block the interaction of 4-1BB and its ligand, the 4-1BB ELISAs were carried out. Briefly, the extracellular domain of human 4-1BB Ligand (4-1BBL) protein with Fc tag (Acro Biosystems) was coated on ELISA plates, followed incubation with human 4-1BB protein (His tag) in the presence of 4-1BB antibodies. HRP-linked anti-6× His tag antibody (Abcam) was used to detect 4-1BB protein bound on its ligand. Then TMB substrate solution (TIANGEN) was used for detection. Samples were analyzed at $OD_{450/620}$ using a microtiter plate reader (infinite F50, TECAN).

Statistical Analysis

Statistical significance was done by GraphPad Prism 7.0 software (GraphPad Software, La Jolla California USA). Statistical analysis was performed by one-way ANOVA followed by Dunnett's multiple comparisons test was employed. *$P<0.05$, $P<0.01$, *$P<0.001$ and data represent mean±SEM unless otherwise noted.

Figure 3:
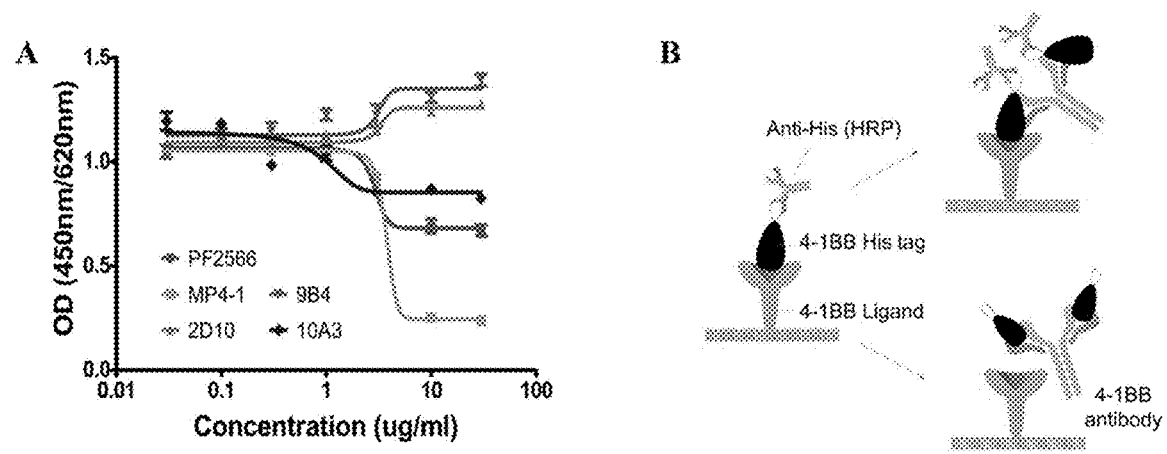
FIG. 3. ELISA to evaluate antibody 4-1BB ligand competition activity. A. Binding activity of mAbs to 4-1BB in the presence of certain amount of 4-1BB Ligand previously immobilized on ELISA plates. B. Schematical representation of 4-1BB recognized by two different kinds of antibody.

Result: Antibodies were tested for their ability to block the binding of the human 4-1BB protein to plate bound recombinant 4-1BB ligand using ELISA. Consistent with previous report, PF2566 bound competitively with recombinant human 4-1BB ligand (4-1BBL) to recombinant human 4-1BB (FIG. 3A). For our 4-1BB antibodies, MP4-1 and 10A3 can block the interaction of 4-1BB and its ligand with different ability, while 2D10 and 9B4 can't affect the interaction (FIG. 3A). Obviously, MP4-1 showed more effective blocking-activity than PF2566.

Example 4. MP4-1 and 2D10 Inhibited Tumor Growth

Isolation of PBMCs and T Cells

Freshly prepared whole blood was obtained from healthy donors and human peripheral blood mononuclear cells (PBMCs) isolated using Ficoll (GE Healthcare) density gradient centrifugation according to the instruction. The EasySep Human CD3 Positive Selection Kit (STEMCELL Technologies Inc., Vancouver, Canada) was used to purify T cells. Isolated T cells were cultured in completed RPMI 1640 with 10% fetal bovine serum and 1% Penicillin/Streptomycin at 37° C. in a 5% $CO_2$ humidified incubator before assays.

Xenograft Models

Four to five weeks old NOD/SCID mice were injected with the cell mixtures of $1×10^6$ LS174T cells and $5×10^6$ human PBMCs in 200 ul PBS at the right flank. Two hours after the engraftment, 4-1BB antibody (5 mg/kg) or vehicle control (PBS) were administered intra-peritoneal. The animals were then treated (100 μg per mouse) on days 0, 2, 6, 8, 10 and 12. Tumor volume was measured with calipers in 2 perpendicular dimensions and was calculated using the formula (width$^2$×length)/2.

Figure 4:
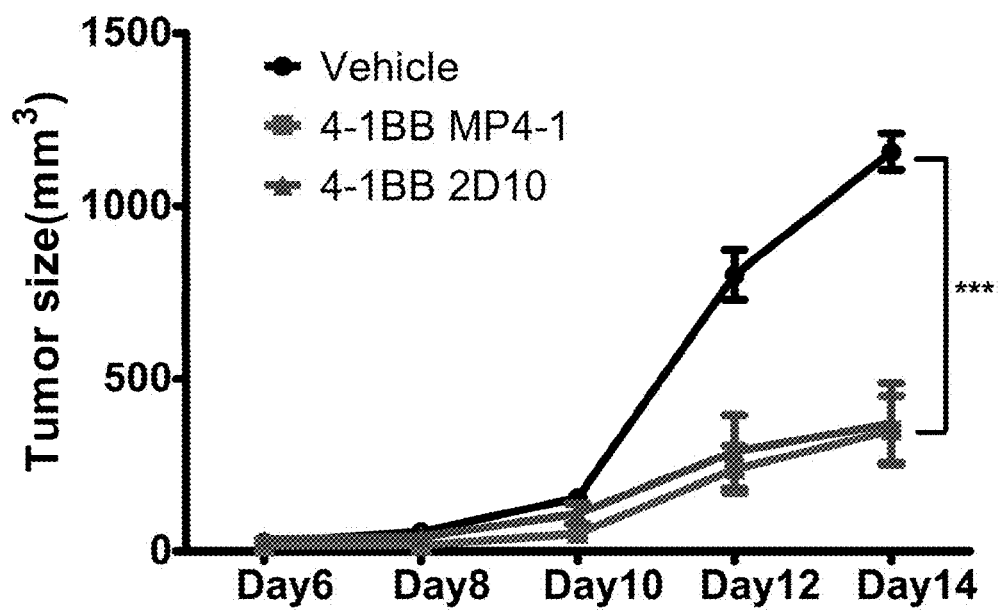
FIG. 4. MP4-1 and 2D10 inhibited tumor growth in vivo. NOD/SCID mice (n=5 per group) were engrafted subcutaneously with LS174T cells ($1\times10^6$ per mouse) and freshly isolated human PBMCs ($5\times10^6$ per mouse), then treated intraperitoneally with vehicle (PBS, Black), MP4-1 (5 mg/kg, Red) or 2D10 (5 mg/kg, Blue) as described above. The tumor volume was then measured. The data represent the average tumor volume of five mice. The error bars represent the standard error (***$P<0.001$, Dunnett's multiple comparisons test, vehicle vs MP4-1 and vehicle vs 2D10).

Result: To further investigate whether 4-1BB antibody could inhibit tumor cell growth in vivo, MP4-1 and 2D10 were used to evaluate anti-tumor activity in NOD/SCID mice. As shown in FIG. 4, from day 10, the tumor volume of each group started to increase, and the tumor volume of the vehicle group increased the fastest, which was significantly faster than that of the 4-1BB MP4-1 group and the 4-1BB 2D10 group. On day 14, the tumor volume of 4-1BB MP4-1 group and 4-1BB 2D10 group was not significantly different, but both were significantly smaller (P<0.001) than the tumor volume of vehicle group. These data demonstrate that 4-1BB antibodies MP4-1 and 2D10 can effectively inhibit tumor growth in a xenograft mouse model.

Example 5. Characterization of Humanized MP4-1

Figure 5:
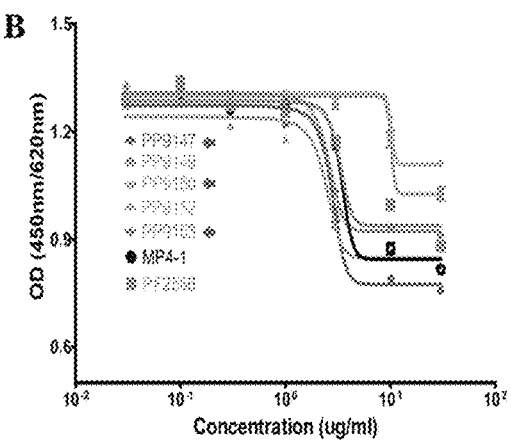
FIG. 5. Characterization of humanized MP4-1 candidates. A. Kinetic interactions of mAbs with 4-1BB determined by BLI analyses. B. Binding activity of mAbs to 4-1BB in the presence of 4-1BB Ligand previously immobilized on ELISA plates.
Figure 6:
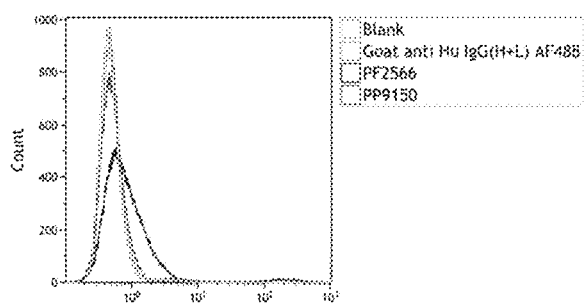
FIG. 6. PP9150 can specifically bind activated T cells. Flow cytometry analysis of 4-1BB mAbs on Jurkat cells (A) and activated T cells (B).
Figure 6:
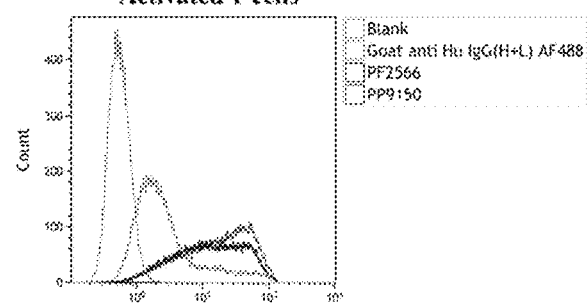

Based on the binding affinity and the activity of 4-1BB antibodies to block the interaction of 4-1BB and its ligand, we chose MP4-1 for further humanization. 9 candidates with human IgG1 structure were constructed and tested 4-1BB binding affinity. As shown in FIG. 5A, only PP9150 and PP9153 have KD value at the nanomolar scale. However, only PP9150 showed similar blocking activity to MP4-1 in antibody 4-1BB ligand competition assay (FIG. 5B). We then tested the binding of PP9150 to cell membrane bound 4-1BB, same as the control PF2566, no binding of PP9150 to 4-1BB negative Jurkat cells were observed (FIG. 6A). Specific binding of PP9150 and PF2566 to the activated T cells was detected (FIG. 6B).

What is claimed is:

1. A humanized 4-1BB monoclonal antibody or antigen-binding fragment thereof, comprising a heavy chain variable region contained in the amino acid sequence shown in SEQ ID NO: 9, SEQ ID NO: 10, or SEQ ID NO: 12, and a light chain variable region contained in the amino acid sequence shown in SEQ ID NO: 11.

2. The humanized 4-1BB monoclonal antibody or antigen-binding fragment thereof of claim 1, comprising a heavy chain contained in SEQ ID NO: 12 or SEQ ID NO: 13, and a light chain contained in SEQ ID NO: 14.

3. The humanized 4-1BB monoclonal antibody or antigen-binding fragment thereof of claim 1, wherein the antigen-binding fragment is selected from scFv, (scFv)₂, Fab, Fab' orF(ab')₂ of the humanized 4-1BB monoclonal antibody.

4. A pharmaceutical composition comprising the humanized 4-1BB monoclonal antibody or antigen-binding fragment thereof of claim 1 and a pharmaceutically acceptable carrier or a second anti-cancer agent.

5. The pharmaceutical composition of claim 4, wherein the second anti-cancer agent is selected from PD-1 antibody, CTLA-4 antibody, GM-CSF, CD40 antibody, cisplatin, cyclophosphamide, cytokine-induced killer cells or IL-2.

6. A method for treating cancer, autoimmune diseases, inflammatory diseases or viral infections in a subject, comprising administering a therapeutically effective amount of the humanized 4-1BB monoclonal antibody or antigen-binding fragment thereof of claim 1 to the subject.

7. The method of claim 6, wherein the cancer is selected from esophageal cancer, stomach cancer, colon cancer, rectal cancer, pancreatic cancer, lung cancer, breast cancer, cervical cancer, corpus carcinoma, ovarian cancer, bladder cancer, head and neck cancer, endometrial cancer, osteosarcoma, prostate cancer, or neuroblastoma.

8. The method of claim 6, wherein the autoimmune disease is selected from Graves' disease, multiple sclerosis, autoimmune liver disease, primary adrenal atrophy, chronic thyroiditis, type 1 diabetes, systemic lupus erythematosus, psoriasis, Crohn's disease, atopic dermatitis, autoimmune hemolytic anemia, myasthenia gravis, demyelinating disease, eczema, graft-versus-host disease, rheumatoid arthritis, scleroderma, sjogren syndrome, chronic nephritis, ankylosing spondylitis, chronic active hepatitis, atrophic gastritis, autoimmune glomerulonephritis, pulmonary and renal hemorrhagic syndrome, idiopathic thrombocytopenic purpura, idiopathic leukopenia, chronic thyroiditis, pernicious anemia, or chronic ulcerative colitis.

9. The method of claim 6, wherein the inflammatory disease is selected from arthritis, tendinitis, arteriosclerosis, polymyalgia rheumatica, bursitis, cystic fibrosis, arthrosteitis, giant cell arteritis, polymyositis, dermatomyositis, pemphigus, pemphigoid, mixed connective tissue disease, sclerosing cholangitis, inflammatory bowel disease, ulcerative colitis, inflammatory skin diseases, asbestosis, silicosis, pneumoconiosis, sarcoidosis, extrinsic allergic alveolitis, hepatitis, delayed type hypersensitivity, pneumonia, respiratory tract inflammation, adult respiratory distress syndrome, encephalitis, immediate hypersensitivity, asthma, hay fever, allergies, acute anaphylaxis, rheumatic fever, cystitis, chronic cholecystitis, allograft rejection, host-versus-graft rejection, appendicitis, arteritis, bronchiolitis, bronchitis, cervicitis, cholangitis, chorioamnionitis, conjunctivitis, dacryoadenitis, dermatomyositis, endocarditis, endometritis, enteritis, epicondylitis, epididymitis, fasciitis, fibrositis, gastritis, gastroenteritis, gingivitis, iritis, laryngitis, myelitis, myocarditis, nephritis, omphalitis, oophoritis, orchitis, osteitis, otitis, pancreatitis, mumps, pericarditis, pharyngitis, pleurisy, phlebitis, prostatitis, rhinitis, salpingitis, sinusitis, stomatitis, synovitis, orchitis, tonsillitis, urethritis, uveitis, vaginitis, vulvitis, vasculitis, osteomyelitis, optic neuritis, temporal arteritis, transverse myelitis, necrotizing fasciitis, or cardiovascular inflammation.

10. The method of claim 6, wherein a disease associated with the viral infection is selected from retinitis, enteritis, infectious mononucleosis, Hodgkin's lymphoma, Burkitt's lymphoma, nasopharyngeal carcinoma, acquired immune deficiency syndrome, upper respiratory tract infection, lower respiratory tract infection, myocarditis, encephalitis, dengue haemorrhagic fever/dengue shock syndrome, hepatitis A, hepatitis B, hepatitis C, gingivostomatitis, keratoconjunctivitis, skin papules, mumps, polio, rabies, rubella or chickenpox.

\* \* \* \* \*

SEQUENCE LISTING

```
<160> NUMBER OF SEQ ID NOS: 16

<210> SEQ ID NO 1
<211> LENGTH: 6
<212> TYPE: PRT
<213> ORGANISM: Artificial Sequence
<220> FEATURE:
<223> OTHER INFORMATION: Heavy chain complementarity determining region
      CDR1 of humanized 4-1BB

<400> SEQUENCE: 1

Trp Ile Ser Trp Val Arg
1               5

<210> SEQ ID NO 2
<211> LENGTH: 17
<212> TYPE: PRT
<213> ORGANISM: Artificial Sequence
<220> FEATURE:
<223> OTHER INFORMATION: Heavy chain complementarity determining region
      CDR2 of humanized 4-1BB

<400> SEQUENCE: 2

His Pro Gly Glu Gly Glu Thr Tyr Tyr Ala Gln Lys Phe Gln Gly Arg
1               5                   10                  15

Val

<210> SEQ ID NO 3
<211> LENGTH: 16
<212> TYPE: PRT
<213> ORGANISM: Artificial Sequence
<220> FEATURE:
<223> OTHER INFORMATION: Heavy chain complementarity determining region
      CDR3 of humanized 4-1BB

<400> SEQUENCE: 3

Cys Ala Arg Arg Thr Arg Tyr Asp Tyr Glu Asp Tyr Phe Ala Met Asp
1               5                   10                  15

<210> SEQ ID NO 4
<211> LENGTH: 6
<212> TYPE: PRT
<213> ORGANISM: Artificial Sequence
<220> FEATURE:
<223> OTHER INFORMATION: Heavy chain complementarity determining region
      CDR1 of humanized 4-1BB

<400> SEQUENCE: 4

Trp Met Asn Trp Val Arg
```

-continued

<210> SEQ ID NO 5
<211> LENGTH: 17
<212> TYPE: PRT
<213> ORGANISM: Artificial Sequence
<220> FEATURE:
<223> OTHER INFORMATION: Heavy chain complementarity determining region
      CDR2 of humanized 4-1BB

<400> SEQUENCE: 5

His Pro Gly Asp Gly Glu Thr Tyr Tyr Asn Gln Lys Phe Gln Gly Arg
1               5                   10                  15
Val

<210> SEQ ID NO 6
<211> LENGTH: 11
<212> TYPE: PRT
<213> ORGANISM: Artificial Sequence
<220> FEATURE:
<223> OTHER INFORMATION: Light chain complementarity determining region
      CDR1' of humanized 4-1BB

<400> SEQUENCE: 6

Cys Gln Ala Ser Gln Gly Ile Asn Gln Tyr Leu
1               5                   10

<210> SEQ ID NO 7
<211> LENGTH: 8
<212> TYPE: PRT
<213> ORGANISM: Artificial Sequence
<220> FEATURE:
<223> OTHER INFORMATION: Light chain complementarity determining region
      CDR2' of humanized 4-1BB

<400> SEQUENCE: 7

Phe Tyr Thr Ser Ser Leu His Thr
1               5

<210> SEQ ID NO 8
<211> LENGTH: 14
<212> TYPE: PRT
<213> ORGANISM: Artificial Sequence
<220> FEATURE:
<223> OTHER INFORMATION: Light chain complementarity determining region
      CDR3' of humanized 4-1BB

<400> SEQUENCE: 8

Ile Ala Thr Tyr Tyr Cys Gln Gln Tyr Ser Glu Leu Pro Phe
1               5                   10

<210> SEQ ID NO 9
<211> LENGTH: 221
<212> TYPE: PRT
<213> ORGANISM: Artificial Sequence
<220> FEATURE:
<223> OTHER INFORMATION: The heavy chain variable region VH of humanized
      4-1BB, Xaa is Glu or Gln

<400> SEQUENCE: 9

Xaa Val Gln Leu Val Gln Ser Gly Ala Glu Val Lys Lys Pro Gly Ser
1               5                   10                  15

Ser Val Lys Val Ser Cys Lys Ala Ser Gly Tyr Gly Phe Ser Ser Ser
                20                  25                  30

Trp Ile Ser Trp Val Arg Gln Ala Pro Gly Gln Gly Leu Glu Trp Met
            35                  40                  45

```
Gly Arg Ile His Pro Gly Glu Gly Glu Thr Tyr Tyr Ala Gln Lys Phe
    50                  55                  60

Gln Gly Arg Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Arg Thr Arg Tyr Asp Tyr Glu Asp Tyr Phe Ala Met Asp Tyr
                100                 105                 110

Trp Gly Gln Gly Thr Leu Val Thr Val Ser Ser Ala Ser Thr Lys Gly
                115                 120                 125

Pro Ser Val Phe Pro Leu Ala Pro Ser Ser Lys Ser Thr Ser Gly Gly
            130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
                180                 185                 190

Thr Val Pro Ser Ser Ser Leu Gly Thr Gln Thr Tyr Ile Cys Asn Val
                195                 200                 205

Asn His Lys Pro Ser Asn Thr Lys Val Asp Lys Arg Val
                210                 215                 220

<210> SEQ ID NO 10
<211> LENGTH: 221
<212> TYPE: PRT
<213> ORGANISM: Artificial Sequence
<220> FEATURE:
<223> OTHER INFORMATION: The heavy chain variable region VH of humanized
      4-1BB

<400> SEQUENCE: 10

Glu Val Gln Leu Val Glu Ser Gly Ala Glu Val Lys Lys Pro Gly Ala
1               5                   10                  15

Ser Val Lys Val Ser Cys Lys Ala Ser Gly Tyr Gly Phe Ser Ser Ser
            20                  25                  30

Trp Met Asn Trp Val Arg Gln Ala Pro Gly Gln Gly Leu Glu Trp Met
        35                  40                  45

Gly Arg Ile His Pro Gly Asp Gly Glu Thr Tyr Tyr Asn Gln Lys Phe
    50                  55                  60

Gln Gly Arg Val Thr Met Thr Ala Asp Lys Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Arg Thr Arg Tyr Asp Tyr Glu Asp Tyr Phe Ala Met Asp Tyr
                100                 105                 110

Trp Gly Gln Gly Thr Thr Val Thr Val Ser Ser Ala Ser Thr Lys Gly
                115                 120                 125

Pro Ser Val Phe Pro Leu Ala Pro Cys Ser Arg Ser Thr Ser Glu Ser
            130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
```

```
                180             185             190
Thr Val Pro Ser Ser Asn Phe Gly Thr Gln Thr Tyr Thr Cys Asn Val
            195             200             205

Asp His Lys Pro Ser Asn Thr Lys Val Asp Lys Thr Val
            210             215             220

<210> SEQ ID NO 11
<211> LENGTH: 214
<212> TYPE: PRT
<213> ORGANISM: Artificial Sequence
<220> FEATURE:
<223> OTHER INFORMATION: Light chain variable region VL of humanized
      4-1BB

<400> SEQUENCE: 11

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Gly Ile Asn Gln Tyr
            20                  25                  30

Leu Asn Trp Tyr Gln Gln Lys Pro Gly Lys Ala Pro Lys Leu Leu Ile
        35                  40                  45

Phe Tyr Thr Ser Ser Leu His Thr Gly Val Pro Ser Arg Phe Ser Gly
    50                  55                  60

Ser Gly Ser Gly Thr Asp Tyr Thr Phe Thr Ile Ser Ser Leu Gln Pro
65                  70                  75                  80

Glu Asp Ile Ala Thr Tyr Tyr Cys Gln Gln Tyr Ser Glu Leu Pro Phe
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 12
<211> LENGTH: 472
<212> TYPE: PRT
<213> ORGANISM: Artificial Sequence
<220> FEATURE:
<223> OTHER INFORMATION: The heavy chain of humanized 4-1BB, Xaa is Glu
      or Gln

<400> SEQUENCE: 12

Met Asp Pro Lys Gly Ser Leu Ser Trp Arg Ile Leu Leu Phe Leu Ser
1               5                   10                  15

Leu Ala Phe Glu Leu Ser Tyr Gly Xaa Val Gln Leu Val Gln Ser Gly
            20                  25                  30

Ala Glu Val Lys Lys Pro Gly Ser Ser Val Lys Val Ser Cys Lys Ala
```

```
                35                  40                  45
Ser Gly Tyr Gly Phe Ser Ser Trp Ile Asn Trp Val Arg Gln Ala
 50                  55                  60
Pro Gly Gln Gly Leu Glu Trp Met Gly Arg Ile His Pro Gly Asp Gly
65                   70                  75                  80
Glu Thr Tyr Tyr Ala Gln Lys Phe Gln Gly Arg Val Thr Ile Thr Ala
                 85                  90                  95
Asp Lys Ser Thr Ser Thr Ala Tyr Met Glu Leu Ser Ser Leu Arg Ser
                100                 105                 110
Glu Asp Thr Ala Val Tyr Tyr Cys Ala Arg Arg Thr Arg Tyr Asp Tyr
                115                 120                 125
Glu Asp Tyr Phe Ala Met Asp Tyr Trp Gly Gln Gly Thr Leu Val Thr
                130                 135                 140
Val Ser Ser Ala Ser Thr Lys Gly Pro Ser Val Phe Pro Leu Ala Pro
145                 150                 155                 160
Cys Ser Arg Ser Thr Ser Glu Ser Thr Ala Ala Leu Gly Cys Leu Val
                165                 170                 175
Lys Asp Tyr Phe Pro Glu Pro Val Thr Val Ser Trp Asn Ser Gly Ala
                180                 185                 190
Leu Thr Ser Gly Val His Thr Phe Pro Ala Val Leu Gln Ser Ser Gly
                195                 200                 205
Leu Tyr Ser Leu Ser Ser Val Val Thr Val Pro Ser Ser Asn Phe Gly
                210                 215                 220
Thr Gln Thr Tyr Thr Cys Asn Val Asp His Lys Pro Ser Asn Thr Lys
225                 230                 235                 240
Val Asp Lys Thr Val Glu Arg Lys Cys Cys Val Glu Cys Pro Pro Cys
                245                 250                 255
Pro Ala Pro Pro Val Ala Gly Pro Ser Val Phe Leu Phe Pro Pro Lys
                260                 265                 270
Pro Lys Asp Thr Leu Met Ile Ser Arg Thr Pro Glu Val Thr Cys Val
                275                 280                 285
Val Val Asp Val Ser His Glu Asp Pro Glu Val Gln Phe Asn Trp Tyr
                290                 295                 300
Val Asp Gly Val Glu Val His Asn Ala Lys Thr Lys Pro Arg Glu Glu
305                 310                 315                 320
Gln Phe Asn Ser Thr Phe Arg Val Val Ser Val Leu Thr Val Val His
                325                 330                 335
Gln Asp Trp Leu Asn Gly Lys Glu Tyr Lys Cys Lys Val Ser Asn Lys
                340                 345                 350
Gly Leu Pro Ala Pro Ile Glu Lys Thr Ile Ser Lys Thr Lys Gly Gln
                355                 360                 365
Pro Arg Glu Pro Gln Val Tyr Thr Leu Pro Pro Ser Arg Glu Glu Met
                370                 375                 380
Thr Lys Asn Gln Val Ser Leu Thr Cys Leu Val Lys Gly Phe Tyr Pro
385                 390                 395                 400
Ser Asp Ile Ala Val Glu Trp Glu Ser Asn Gly Gln Pro Glu Asn Asn
                405                 410                 415
Tyr Lys Thr Thr Pro Pro Met Leu Asp Ser Asp Gly Ser Phe Phe Leu
                420                 425                 430
Tyr Ser Lys Leu Thr Val Asp Lys Ser Arg Trp Gln Gln Gly Asn Val
                435                 440                 445
Phe Ser Cys Ser Val Met His Glu Ala Leu His Asn His Tyr Thr Gln
                450                 455                 460
```

Lys Ser Leu Ser Leu Ser Pro Gly
465                 470

<210> SEQ ID NO 13
<211> LENGTH: 472
<212> TYPE: PRT
<213> ORGANISM: Artificial Sequence
<220> FEATURE:
<223> OTHER INFORMATION: The heavy chain of humanized 4-1BB

<400> SEQUENCE: 13

Met Asp Pro Lys Gly Ser Leu Ser Trp Arg Ile Leu Leu Phe Leu Ser
1               5                   10                  15

Leu Ala Phe Glu Leu Ser Tyr Gly Glu Val Gln Leu Val Glu Ser Gly
            20                  25                  30

Ala Glu Val Lys Lys Pro Gly Ala Ser Val Lys Val Ser Cys Lys Ala
        35                  40                  45

Ser Gly Tyr Gly Phe Ser Ser Ser Trp Met Asn Trp Val Arg Gln Ala
    50                  55                  60

Pro Gly Gln Gly Leu Glu Trp Met Gly Arg Ile His Pro Gly Asp Gly
65                  70                  75                  80

Glu Thr Tyr Tyr Asn Gln Lys Phe Gln Gly Arg Val Thr Met Thr Ala
                85                  90                  95

Asp Lys Ser Thr Ser Thr Val Tyr Met Glu Leu Ser Ser Leu Arg Ser
            100                 105                 110

Glu Asp Thr Ala Val Tyr Tyr Cys Ala Arg Arg Thr Arg Tyr Asp Tyr
        115                 120                 125

Glu Asp Tyr Phe Ala Met Asp Tyr Trp Gly Gln Gly Thr Thr Val Thr
    130                 135                 140

Val Ser Ser Ala Ser Thr Lys Gly Pro Ser Val Phe Pro Leu Ala Pro
145                 150                 155                 160

Cys Ser Arg Ser Thr Ser Glu Ser Thr Ala Ala Leu Gly Cys Leu Val
                165                 170                 175

Lys Asp Tyr Phe Pro Glu Pro Val Thr Val Ser Trp Asn Ser Gly Ala
            180                 185                 190

Leu Thr Ser Gly Val His Thr Phe Pro Ala Val Leu Gln Ser Ser Gly
        195                 200                 205

Leu Tyr Ser Leu Ser Ser Val Val Thr Val Pro Ser Ser Asn Phe Gly
    210                 215                 220

Thr Gln Thr Tyr Thr Cys Asn Val Asp His Lys Pro Ser Asn Thr Lys
225                 230                 235                 240

Val Asp Lys Thr Val Glu Arg Lys Cys Cys Val Glu Cys Pro Pro Cys
                245                 250                 255

Pro Ala Pro Pro Val Ala Gly Pro Ser Val Phe Leu Phe Pro Pro Lys
            260                 265                 270

Pro Lys Asp Thr Leu Met Ile Ser Arg Thr Pro Glu Val Thr Cys Val
        275                 280                 285

Val Val Asp Val Ser His Glu Asp Pro Glu Val Gln Phe Asn Trp Tyr
    290                 295                 300

Val Asp Gly Val Glu Val His Asn Ala Lys Thr Lys Pro Arg Glu Glu
305                 310                 315                 320

Gln Phe Asn Ser Thr Phe Arg Val Val Ser Val Leu Thr Val Val His
                325                 330                 335

Gln Asp Trp Leu Asn Gly Lys Glu Tyr Lys Cys Lys Val Ser Asn Lys
            340                 345                 350

Gly Leu Pro Ala Pro Ile Glu Lys Thr Ile Ser Lys Thr Lys Gly Gln
            355                 360                 365

Pro Arg Glu Pro Gln Val Tyr Thr Leu Pro Pro Ser Arg Glu Glu Met
    370                 375                 380

Thr Lys Asn Gln Val Ser Leu Thr Cys Leu Val Lys Gly Phe Tyr Pro
385                 390                 395                 400

Ser Asp Ile Ala Val Glu Trp Glu Ser Asn Gly Gln Pro Glu Asn Asn
                405                 410                 415

Tyr Lys Thr Thr Pro Pro Met Leu Asp Ser Asp Gly Ser Phe Phe Leu
            420                 425                 430

Tyr Ser Lys Leu Thr Val Asp Lys Ser Arg Trp Gln Gln Gly Asn Val
            435                 440                 445

Phe Ser Cys Ser Val Met His Glu Ala Leu His Asn His Tyr Thr Gln
    450                 455                 460

Lys Ser Leu Ser Leu Ser Pro Gly
465                 470

<210> SEQ ID NO 14
<211> LENGTH: 234
<212> TYPE: PRT
<213> ORGANISM: Artificial Sequence
<220> FEATURE:
<223> OTHER INFORMATION: The light chain of humanized 4-1BB

<400> SEQUENCE: 14

Met Glu Thr Asp Thr Leu Leu Leu Trp Val Leu Leu Leu Trp Val Pro
1               5                   10                  15

Gly Ser Thr Gly Asp Ile Gln Met Thr Gln Ser Pro Ser Ser Leu Ser
            20                  25                  30

Ala Ser Val Gly Asp Arg Val Thr Ile Thr Cys Gln Ala Ser Gln Gly
        35                  40                  45

Ile Asn Gln Tyr Leu Asn Trp Tyr Gln Gln Lys Pro Gly Lys Ala Pro
    50                  55                  60

Lys Leu Leu Ile Phe Tyr Thr Ser Ser Leu His Thr Gly Val Pro Ser
65                  70                  75                  80

Arg Phe Ser Gly Ser Gly Ser Gly Thr Asp Tyr Thr Phe Thr Ile Ser
                85                  90                  95

Ser Leu Gln Pro Glu Asp Ile Ala Thr Tyr Tyr Cys Gln Gln Tyr Ser
            100                 105                 110

Glu Leu Pro Phe Thr Phe Gly Gln Gly Thr Lys Leu Glu Ile Lys Arg
        115                 120                 125

Thr Val Ala Ala Pro Ser Val Phe Ile Phe Pro Pro Ser Asp Glu Gln
    130                 135                 140

Leu Lys Ser Gly Thr Ala Ser Val Val Cys Leu Leu Asn Asn Phe Tyr
145                 150                 155                 160

Pro Arg Glu Ala Lys Val Gln Trp Lys Val Asp Asn Ala Leu Gln Ser
                165                 170                 175

Gly Asn Ser Gln Glu Ser Val Thr Glu Gln Asp Ser Lys Asp Ser Thr
            180                 185                 190

Tyr Ser Leu Ser Ser Thr Leu Thr Leu Ser Lys Ala Asp Tyr Glu Lys
        195                 200                 205

His Lys Val Tyr Ala Cys Glu Val Thr His Gln Gly Leu Ser Ser Pro
    210                 215                 220

Val Thr Lys Ser Phe Asn Arg Gly Glu Cys
225                 230

```
<210> SEQ ID NO 15
<211> LENGTH: 24
<212> TYPE: PRT
<213> ORGANISM: Artificial Sequence
<220> FEATURE:
<223> OTHER INFORMATION: signal peptide

<400> SEQUENCE: 15

Met Asp Pro Lys Gly Ser Leu Ser Trp Arg Ile Leu Leu Phe Leu Ser
1               5                   10                  15

Leu Ala Phe Glu Leu Ser Tyr Gly
            20

<210> SEQ ID NO 16
<211> LENGTH: 20
<212> TYPE: PRT
<213> ORGANISM: Artificial Sequence
<220> FEATURE:
<223> OTHER INFORMATION: signal peptide

<400> SEQUENCE: 16

Met Glu Thr Asp Thr Leu Leu Leu Trp Val Leu Leu Leu Trp Val Pro
1               5                   10                  15

Gly Ser Thr Gly
            20
```